(12) United States Patent
Li et al.

(10) Patent No.: US 12,507,203 B2
(45) Date of Patent: Dec. 23, 2025

(54) MULTI-SUBSCRIBER IDENTIFICATION MODULE TECHNIQUES FOR WIRELESS SYSTEMS

(71) Applicant: ZTE Corporation, Guangdong (CN)

(72) Inventors: Wenting Li, Shenzhen (CN); He Huang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 567 days.

(21) Appl. No.: 17/971,247

(22) Filed: Oct. 21, 2022

(65) Prior Publication Data

US 2023/0038897 A1 Feb. 9, 2023

Related U.S. Application Data

(63) Continuation of application No. PCT/CN2020/122685, filed on Oct. 22, 2020.

(51) Int. Cl.
*H04W 68/02* (2009.01)

(52) U.S. Cl.
CPC .................. *H04W 68/02* (2013.01)

(58) Field of Classification Search
CPC .................................................. H04W 68/02
USPC .......................................................... 455/458
See application file for complete search history.

(56) References Cited

U.S. PATENT DOCUMENTS

| 2004/0176112 A1* | 9/2004 | Beckmann | H04W 68/025 |
| | | | 455/518 |
| 2010/0178916 A1* | 7/2010 | Jamadagni | H04W 24/02 |
| | | | 455/449 |
| 2020/0022104 A1 | 1/2020 | Geng et al. | |

FOREIGN PATENT DOCUMENTS

| CN | 110999459 A | 2/2020 |
| EP | 3665990 A1 | 6/2020 |
| WO | 2018171457 A1 | 9/2018 |
| WO | 2019028863 A1 | 2/2019 |
| WO | 2020106611 A1 | 5/2020 |

OTHER PUBLICATIONS

Partial European Search Report issued in EP Patent Application No. 20958142.0, dated Nov. 28, 2023, 18 pages.

(Continued)

*Primary Examiner* — Joel Ajayi
(74) *Attorney, Agent, or Firm* — Perkins Coie LLP

(57) ABSTRACT

This patent document describes, among other things, techniques, and apparatuses for providing multiple network connections to improve wireless network efficiency and performance. In one aspect, a method of wireless communication is disclosed. The method includes determining, by a network node, whether to include a paging cause indication in a paging message based on a rule. The method further includes transmitting, by the network node, the paging message according to the determining, wherein the rule specifies that: in case that the paging message is being transmitted due to a common paging cause, the paging cause indication is omitted, and in case that the paging message is being transmitted due to a different paging cause that is different from the common paging cause, the paging message is transmitted by indicating the different paging cause in the paging cause indication.

14 Claims, 15 Drawing Sheets

100

```
Paging ::=                  SEQUENCE {
    pagingRecordList        PagingRecordList           OPTIONAL, -- Need N
    lateNonCriticalExtension OCTET STRING             OPTIONAL,
    nonCriticalExtension Paging-v17xy-IEs                        OPTIONAL
}
Paging-v17xy-IEs ::=        SEQUENCE {
    pagingCauseList-v17xy   PagingCauseList-v17xy     OPTIONAL, -- Need N
    nonCriticalExtension    SEQUENCE {}               OPTIONAL
}
PagingRecordList ::=        SEQUENCE (SIZE(1..maxNrofPageRec)) OF PagingRecord
PagingCauseList-v17xy ::=   SEQUENCE (SIZE(1..maxNrofPageRec)) OF PagingRCause-v17xy
PagingRecord ::=            SEQUENCE {
    ue-Identity             PagingUE-Identity,
    accessType              ENUMERATED {non3GPP}   OPTIONAL,  -- Need N ...
}
PagingRecord-v17xy ::=      SEQUENCE {
    pagingCause-r17         ENUMERATED {voice, spare1, spare2, spare3, spare4, spare5, spare6, spare7}
    OPTIONAL        -- Need N}
PagingUE-Identity ::=       CHOICE {
    ng-5G-S-TMSI            NG-5G-S-TMSI,
    fullI-RNTI              I-RNTI-Value,
    ...}
NG-5G-S-TMSI ::=            BIT STRING (SIZE (48))
I-RNTI-Value ::=            BIT STRING (SIZE(40))
maxNrofPageRec              INTEGER ::= 32    -- Maximum number of page records
```

(56) References Cited

OTHER PUBLICATIONS

Cisco: "Command Line Interface Reference, Modes R-Z, StarOS Release 21.11", Nov. 27, 2018 (Nov. 27, 2018), XP002810495, Retrieved from the Internet: URL:https://www.cisco.com/c/en/us/td/docs/wireless/asr_S000/21-11_6-5/Mode_R-Z-CLI-Reference/21-11-R-Z_CLI-Reference/21-11-R-Z_CLI-Reference_chapter_0111.html#reference_db70e416-4023-4a21-8c9f-38dc54987ele [retrieved on Nov. 15, 2023] * Section "ranap paging-cause-ie"*.

Vivo: "[Draft] E-mail discussion: [Postlll-e] [917] [Multi-SIM] Multi-Sim (vivo)", 3GPP TSG-RAN WG2 Meeting #112E; Draft_R2-200XXXX Summary of 917_multi-sim_summary.docx www.3gpp.org /FTP/Email_Discussions / RAN2 / [RAN2#111-E] / [POSTlll-E] [917] [Multi-Sim] Multi-Sim (Vivo), Oct. 15, 2020 (Oct. 15, 2020), XP055923494, * 2.1.3 * * p. 62 *.

International Preliminary Report on Patentability issued in International Patent Application No. PCT/CN2020/122685, dated Apr. 13, 2023, 5 pages.

Vivo, "[Draft] E-mail discussion: [Post111-e][917][Multi-SIM] Multi-Sim (vivo)," 3GPP TSG RAN WG2 Meeting #112e, Online, R2-20xxxxx, 38 pages, Nov. 2-13, 2020.

Asustek, "Mechanism for UE to notify network switch," 3GPP TSG RAN WG2 Meeting #111e, Electronic, R2-2007740, 4 pages, Aug. 17-28, 2020.

Samsung, "General changes resulting from ASN.1 review for LTE RRC REL-16," 3GPP TSG RAN2 Meeting #110-e, Electronic, R2-2005845, 118 pages, Jun. 1-12, 2020.

International Search Report and Written Opinion for International Application No. PCT/CN2020/122685, mailed on Jul. 21, 2021 (7 pages).

EPO, Extended European Search Report for European Application No. 20 958 142.0, mailed on Feb. 19, 2024, 14 pages.

CNIPA, First Office Action for Chinese Application No. 202080099641.0, mailed on Jun. 28, 2024, 1 pages with unofficial English translation.

CNIPA, Notification to Grant Patent Right for Invention for Chinese Application No. 202080099641.0, mailed on Dec. 19, 2024, 4 pages with English translatio.

* cited by examiner

```
Paging ::=                      SEQUENCE {
    pagingRecordList            PagingRecordList                        OPTIONAL, -- Need N
    lateNonCriticalExtension    OCTET STRING                            OPTIONAL,
    nonCriticalExtension        Paging-v17xy-IEs                        OPTIONAL
}

Paging-v17xy-IEs ::=            SEQUENCE {
    pagingCauseList-v17xy       PagingCauseList-v17xy                   OPTIONAL,  -- Need N
    nonCriticalExtension        SEQUENCE {}                             OPTIONAL
}

PagingRecordList ::=            SEQUENCE (SIZE(1..maxNrofPageRec)) OF PagingRecord
PagingCauseList-v17xy ::=       SEQUENCE (SIZE(1..maxNrofPageRec)) OF PagingRCause-v17xy
PagingRecord ::=                SEQUENCE {
    ue-Identity                 PagingUE-Identity,
    accessType                  ENUMERATED {non3GPP}                    OPTIONAL, -- Need N ...
}
PagingRecord-v17xy ::=          SEQUENCE {
    pagingCause-r17             ENUMERATED {voice, spare1, spare2, spare3, spare4, spare5, spare6, spare7}
    OPTIONAL                    -- Need N}
PagingUE-Identity ::=           CHOICE {
    ng-5G-S-TMSI                NG-5G-S-TMSI,
    fullI-RNTI                  I-RNTI-Value,
    ...}
NG-5G-S-TMSI ::=                BIT STRING (SIZE (48))
I-RNTI-Value ::=                BIT STRING (SIZE(40))
maxNrofPageRec                  INTEGER ::= 32    -- Maximum number of page records
```

```
Paging ::=                      SEQUENCE {
    pagingRecordList            PagingRecordList            OPTIONAL, -- Need N
    lateNonCriticalExtension    OCTET STRING                OPTIONAL,
    NonCriticalExtension        Paging-v17xy-IEs                                        OPTIONAL
}

Paging-v17xy-IEs ::=            SEQUENCE {
    commonPagingCause           ENUMERATED {voice, spare1, spare2, spare3, spare4, spare5, spare6, spare7}
                                                            OPTIONAL    -- Need N}
    pagingCauseList-v17xy       PagingCauseList-v17xy                   OPTIONAL, -- Need N
    nonCriticalExtension        SEQUENCE {}                             OPTIONAL
}

PagingCauseList-v17xy ::=       SEQUENCE (SIZE(1..maxNrofPageRec)) OF PagingCause-v17xy
PagingCause-v17xy ::=           SEQUENCE {
    pagingCause-r17             ENUMERATED {voice, spare1, spare2, spare3, spare4, spare5, spare6, spare7}
    OPTIONAL        -- Need N}
```

```
Paging ::=                      SEQUENCE {
    pagingRecordList            PagingRecordList                                    OPTIONAL, -- Need N
    lateNonCriticalExtension    OCTET STRING                                        OPTIONAL,
    nonCriticalExtension        Paging-v17xy-IEs                                    OPTIONAL
}
Paging-v17xy-IEs ::=            SEQUENCE {
    pagingCauseStartValue       ENUMERATED {voice, spare1, spare2, spare3, spare4, spare5,
                                            spare6, spare7}                         OPTIONAL    -- Need N}
    pagingCauseList-v17xy       PagingCauseList-v17xy                               OPTIONAL,-- Need N
    nonCriticalExtension        SEQUENCE {}                                         OPTIONAL
}
PagingRecordList ::=            SEQUENCE (SIZE(1..maxNrofPageRec)) OF PagingRecord
PagingCauseList-v17xy ::=       SEQUENCE (SIZE(1..maxNrofPageCause-1)) OF PagingCause-
v17xy
PagingRecord ::=                SEQUENCE {
    ue-Identity                 PagingUE-Identity,
    accessType                  ENUMERATED {non3GPP}    OPTIONAL,    -- Need N   ...
}
PagingCause-v17xy ::=           SEQUENCE {
    pagingCauseIndex            BIT STRING (SIZE (5))                               OPTIONAL        -- Need N
}
```

FIG. 3

```
Paging ::=                          SEQUENCE {
    pagingRecordList                PagingRecordList             OPTIONAL, -- Need N
    lateNonCriticalExtension        OCTET STRING                 OPTIONAL,
    nonCriticalExtension            Paging-v17xy-IEs                              OPTIONAL
}

Paging-v17xy-IEs ::=                SEQUENCE {
    pagingCauseList-v17xy           PagingCauseList-v17xy        OPTIONAL,  -- Need N
    nonCriticalExtension            SEQUENCE {}                  OPTIONAL
}

PagingCauseList-v17xy ::=           SEQUENCE (SIZE(1..maxNrofPageRec)) OF PagingCause-v17xy
PagingCause-v17xy ::=               SEQUENCE {
    pagingCause-r17                 ENUMERATED {voice, spare1, spare2, spare3, spare4, spare5, spare6, spare7}
}
```

```
RRCConnectionReconfiguration::=    SEQUENCE {
otherConfig-r17         OtherConfig-r17 OPTIONAL, OPTIONAL, -- Need M}
OtherConfig-r17 ::=   SEQUENCE {
mutisimSwithingNotification-r17   ENUMERATED {true}   OPTIONAL, OPTIONAL, -- Need M
MultiSimReleaseTime          ENUMERATED { f40, sf64, ms80, sf100, sf128, sf160, spare, spare }
OPTIONAL, -- Need M}
```

FIG. 6

Transmitting, from a network node to a wireless device, a paging message including one or more paging causes, wherein the paging message further includes a number of paging records for each of one or more paging causes ~1110

FIG. 11

MULTI-SUBSCRIBER IDENTIFICATION MODULE TECHNIQUES FOR WIRELESS SYSTEMS

CROSS REFERENCE TO RELATED APPLICATIONS

This patent document is a continuation of and claims benefit of priority to International Patent Application No. PCT/CN2020/122685, filed on Oct. 22, 2020. The entire content of the before-mentioned patent application is incorporated by reference as part of the disclosure of this application.

TECHNICAL FIELD

This patent document is directed generally to wireless communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, connections to multiple networks simultaneously, longer battery life, and improved performance are being discussed.

SUMMARY

This patent document describes, among other things, techniques, and apparatuses for providing multiple network connections to improve wireless network efficiency and performance.

In one aspect, a method is disclosed. The method includes determining, by a network node, whether to include a paging cause indication in a paging message based on a rule. The method further includes transmitting, by the network node, the paging message according to the determining, wherein the rule specifies that: in case that the paging message is being transmitted due to a common paging cause, the paging cause indication is omitted, and in case that the paging message is being transmitted due to a different paging cause that is different from the common paging cause, the paging message is transmitted by indicating the different paging cause in the paging cause indication.

In another aspect, another method is disclosed. The method includes receiving, by a wireless device, a paging message including a paging cause indication. The method includes determining, by the wireless device, a paging cause based on a common paging cause, a paging cause list, and a legacy paging record list, wherein a first element in the paging cause list indicates the paging cause of a first paging record in the legacy paging record list.

In another aspect, another method is disclosed. The method includes transmitting, from a network node to a wireless device, a paging message including one or more paging causes, wherein the paging message further includes a number of paging records for each of one or more paging causes.

In another aspect, another method is disclosed. The method includes receiving, by a wireless device, a paging message including a paging cause indication. The method further includes determining, by the wireless device, a paging cause based on the paging cause indication, a paging cause list, and a legacy paging record list, wherein, the paging cause list including a number of records for each paging cause in the paging cause list.

In another aspect, another method is disclosed. The method includes determining, by a network node, a first number of paging records from a list of paging records having a second number of paging records, wherein the first number of paging records have paging causes from a paging cause list, wherein the paging causes are associated the first number of paging records. The method further includes transmitting, by the network node, a paging message in which a size of the paging record list is indicated according to the first number of paging records that have paging causes associated therewith.

In another aspect, another method is disclosed. The method includes receiving, by a wireless device, a paging message including a paging cause indication. The method further includes determining, by the wireless device, the paging cause based on the paging cause indication, a paging cause list, and a legacy paging record list, wherein a first element in the paging cause list indicates a first paging cause of a first paging record in the legacy paging record list.

In another aspect, another method is disclosed. The method includes transmitting, by a network node to a wireless device, an indication that the network node is capable of performing multi-SIM switching and release, wherein the indication is carried in a system information message or a non-access stratum message.

In another aspect, another method is disclosed. The method includes receiving, at a wireless device, a plurality of wireless device identifiers for the wireless device. The method further includes selecting, by the wireless device, one of the plurality of wireless device identifiers based on a paging control channel (PCCH) configuration in a neighboring cell that avoids a paging collision.

These, and other, aspects are described in the present document.

BRIEF DESCRIPTION OF DRAWINGS

FIG. 1 depicts an example of abstract syntax notation (ASN.1) code for an example of a paging message.

FIG. 2 depicts an example of ASN.1 code for a paging message using a first optimization method.

FIG. 3 depicts an example of ASN.1 code for a paging message using a second optimization method.

FIG. 4 depicts an example of ASN.1 code for a paging message using a third optimization method.

FIG. 6 depicts an example of ASN.1 code for a multi-universal subscriber identity module (MUSIM) switching notification.

FIGS. 9-13 depict examples of methods for wireless communication.

DETAILED DESCRIPTION

Figure 5:
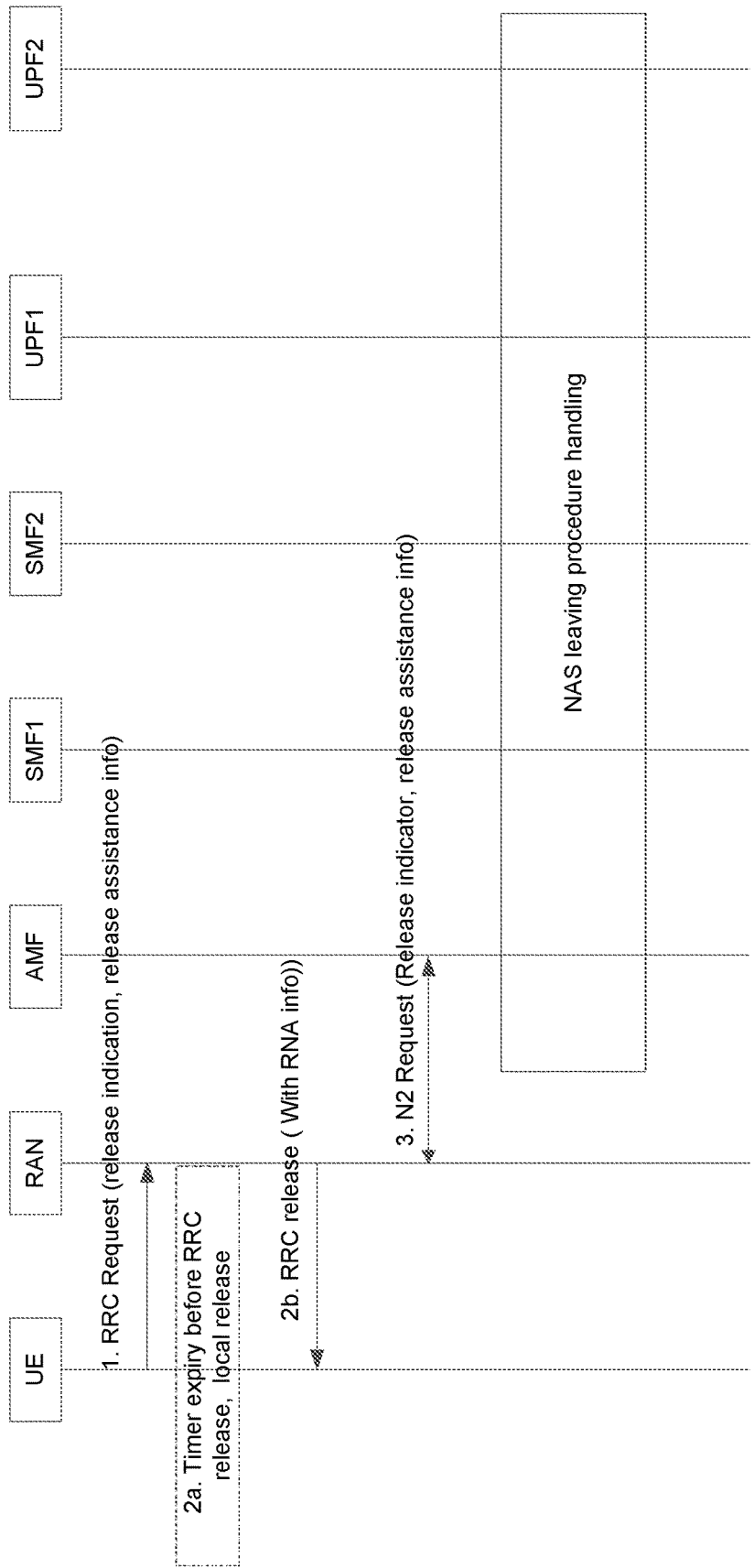
FIG. 5 depicts an example of a radio resource control based release procedure.

Certain features are described using the example of Fifth Generation (5G) wireless protocol. However, applicability of the disclosed techniques is not limited to only 5G wireless systems.

Headings are used below for clarity of presentation and are not intended to limit the applicability of the subject matter across the various disclosed embodiments.

Wireless devices with multiple subscriber identity modules (multi-SIM may connect to multiple networks at the same time. Disclosed are devices and techniques for providing multi-SIM capability including adding a paging cause for paging messages, and reallocation of multiple serving temporary mobile subscriber identities (S-TMSI) (e.g., 5G STMSI) to the wireless device to resolve paging collision. As used herein, "user equipment" or "UE" refers to any kind of wireless device including a UE, a mobile station, smartphone, tablet device, laptop device, or any other wireless device. The foregoing terms are used interchangeably.

The following issues are addressed, among others:
1) Specify enhancement(s) to address the collision due to the reception of paging when the UE is in an IDLE/INACTIVE mode in both the networks associated with respective SIMs
   Radio access technology (RAT) concurrency: Network A can be a new radio (NR). Network B can either be a long-term evolution (LTE) device or a NR device.
   Applicable UE architecture: Single-receive/Single-transmit
2) Specify a mechanism for the UE to notify Network A of its switch from Network A (for multi-user SIM):
   RAT concurrency: Network A is NR. Network B can either be LTE or NR.
   Applicable UE architecture: Single-receive/Single-transmit or dual-receive/Single-transmit
3) Unless system aspects working group 2 (SA2) device, specify a mechanism for an incoming page to indicate to the UE whether the service is voice over LTE/voice over NR (voLTE/VoNR).[RAN2]
   RAT concurrency: Network A is either LTE or NR. Network B is either LTE or NR.
   Applicable UE architecture: Single-receive/Dual-receive/Single-transmit Paging Cause For the multi-SIM UE, the UE may register with more than one network. For example, a first US SIM (USIM1) may be registered under Network A, while the USIM2 is registered at network B. Then if the UE is in a connected state to one network (e.g. Network A), the UE needs to detect paging from network B. Once paging is detected, the UE needs to determine which USIM's service will be continued. For example, if network A is downloading some files, then the UE will receive an MT call paging. If the UE cannot operate in a dual connected state, the UE may release the connection from the network A. However, from the paging message, the UE Is not able to determine the trigger reason of the paging—whether it is voice or data. Described below is are example techniques for adding a paging cause to the paging message.

FIG. 1 depicts an example of abstract syntax notation (ASN.1) code for the foregoing example of a paging message. In this example, for each paging record, a paging cause is added. The problem with each paging record having a paging cause is that if there are 32 paging records, there would be 32*4=128 bits added. These added bits affect the paging signaling overhead and affect the paging coverage.

Some optimization methods are described below.

Paging Cause Signaling Optimization Method 1

A common cause value can be added to the paging message. Then for a paging record with the common paging cause, only paging records with a different paging cause need to be indicated.

FIG. 2 depicts an example of ASN.1 code for a paging message using optimization method 1. The field commonPagingCause indicates the common paging cause, for the first m paging records that with the corresponding paging cause in the PagingRecordList-v17x set to absent (no paging cause given), the common paging cause can be adopted, where m is less than or equal to the size of PagingCauseList-v17x.

A paging cause that is different from the common paging cause can be indicated in the PagingCauseList-v17xy.

The size of the PagingCauseList-v17xy can be the number of the paging records with the paging cause. For example, if there are x paging records in the legacy pagingRecordList, and y paging records have that paging cause, then the size of the pagingCauseList-v17xy is y.

The network can put the paging records with paging cause first in the legacy pagingRecordList.

The network can set the paging cause with the most paging records as the common paging cause.

At the UE, for the first m paging records with the corresponding paging cause in the PagingCauseList-v17xy set to absent, the common paging cause can be adopted, where the m is less than or equal to the size of PagingCauseList-v17xy.

At the UE, the UE first determines whether it has a paging cause by checking whether it belongs to the first y entries in the legacy pagingRecordList, where y is the size of PagingCauseList-v17xy. If the UE has a paging cause, it further determines the paging cause by the corresponding value in the PagingCauseList-v17xy. The first element in the PagingCauseList-v17xy indicates the paging cause of the first paging record in the legacy pagingRecordList. If the paging cause in the PagingCauseList-v17xy for the corresponding paging record is set to be absent, the UE adopts the common paging cause.

Example for Optimization Method 1

In this example, there are 5 paging records in the legacy paging record list, and there are 4 paging records with the paging cause, e.g., paging record 1/3 with paging cause 3 and paging record 2 with paging cause 1 and paging record 4 with paging cause 2. Then the commonPagingCause value can be set to cause 3, and set the size of agingRecordList-v17xy to be 4, and set the PagingCauseList-v17xy to be as follows:

TABLE 1

Paging Records and Paging cause

| | Paging record 1 | Paging record 2 | Paging record 3 | Paging record 4 | Paging record 5 |
|---|---|---|---|---|---|
| pagingRecordList | 1 | 2 | 3 | 4 | 5 |
| PagingCauseList-v17xy | absent | Present with cause 1 | absent | Present with cause 2 | |

Paging Cause Signaling Optimization Method 2

In another technique, for a particular UE ID, paging records with the same paging cause are put together, and then the number of paging records for each of the paging cause is indicated.

Example for Optimization Method 2

In this example, a paging cause does not need to be added for each paging record. Instead, a paging cause list can be added (PagingCauseList) is added as shown below in Table 2.

TABLE 2

Paging Records and Paging cause

| Paging Cause 1 | Paging Cause 2 | Paging Cause 3 | Paging Cause 4 |
|---|---|---|---|
| Paging Record 1~x1 | Paging Record x1 + 1~x2 | No Paging Record | Paging Record x2 + 1~number of paging Record |

Example of a Paging Cause Index List for Each Paging Cause

Table 3 shows an example of a paging cause list including each paging cause.

TABLE 3

Paging Cause Index List for each paging cause

| Paging Cause Index List | Record Present | Record Index if present |
|---|---|---|
| Paging Cause 1 | Present | x1 |
| Paging Cause 2 | Present | x2 |
| Paging Cause 3 | Not present | |

For the paging records from X2+1 to the end (number of paging records), may include R16/15 UEs without a paging cause, and the R17 UEs that would use a paging cause 4. Even there is no paging record with paging cause 3, the paging cause 3 was listed, then the UE will be informed that the last paging cause is 4.

FIG. 3 depicts an example of ASN.1 code for the foregoing example. In FIG. 3, PagingCauseList-v17xy indicates the index for each paging cause. The first element corresponds to the maximum paging record index for the pagingCauseStartValue. If there is only one paging cause, this list is absent.

In the pagingRecordList, the network will put the paging record with paging cause "pagingCauseStartValue" first, then put the other paging records according to the paging cause sequence.

In some example embodiments, the sequence of paging causes is voice, spare1, spare2, spare3, spare4, spare5, spare6, spare7.

The pagingCauseStartValue indicate the first paging cause according to the paging cause sequence.

In this example, the network will set the PagingCauseList as: PagingCauseList [0]{x1}, PagingCauseList [1]{x2}, PagingCauseList [2]{not present}.

The UE first determines whether it has paging cause by checking whether it belongs to the first y entries in the legacy pagingRecordList, where y is the size of Paging-CauseList-v17xy. If the UE has a paging cause, it further determines the paging cause based on the number of records for each paging cause in the PagingCauseList-v17xy. In this example, a UE that belongs to the first x1 paging records in the legacy paging record list will adopt the first paging cause. If the UE belongs to the (x1+1)~x2 paging records in the legacy paging record list, it will adopt the second paging cause. If the UE belongs to the (x2+1)~y paging records in the legacy paging record list, it will adopt the third paging cause, where y is the size of PagingCauseList-v17xy.

Paging Cause Signaling Optimization Method 3

FIG. 4 depicts an example of ASN.1 code for a paging message in accordance with method 3.

In this method, the signaling is the same as signaling described above, with different meaning given to the newly added elements. (e.g. PagingCauseList-v17xy, PagingRecord-v17xy).

The size of the PagingCauseList-v17x can be set to the number of paging records with a paging cause. For example, if there are x paging records in the legacy pagingRecordList, and y paging records have that paging cause, then the size of the agingRecordList-v17x would be y.

The network can put the paging records that with paging cause together.

For paging records with the same paging cause as a previous paging record, the pagingCause-r17 can be set to absent.

At the UE, for each of the first y paging records, if the corresponding paging cause in the PagingCauseList-v17x is set to absent, the paging cause of the previous paging record can be adopted, where the y is the size of PagingCauseList-v17x. The UE first determines whether it has paging cause by checking whether it belongs to the first y entries in the legacy pagingRecordList, where y is the size of Paging-CauseList-v17xy. If the UE has a paging cause, it further determines the paging cause by the corresponding value in the PagingCauseList-v17xy. The first element in the PagingCauseList-v17xy indicates the paging cause of the first paging record in the legacy pagingRecordList. If the paging cause in the PagingCauseList-v17xy for the corresponding paging record is set to absent (no paging cause given), the UE with the corresponding paging record will use the last paging cause that was indicated in the sequence of paging causes in the PagingCauseList-v17xy. For example, using Table 4 below, the UE with paging record 2 or 3 which has no paging cause given will use the paging cause of paging record 1 which is paging cause m. Paging cause m is the last paging cause indicated in the sequence of the list of paging causes from paging cause m to paging cause n.

Example for Optimization Method 3

There are 5 paging records in the legacy paging record list, and there are 4 paging records with the paging cause, e.g. paging record 1/2/3 with paging cause m and paging record 4 with paging cause n. Then we can set the cause of paging record 2/3 as absent, and the size of agingRecord-List-v17xy set to 4, and set the PagingCauseList-v17xy to be as follows. From the UE side, for the UE with paging record 2/3, will refer the paging cause of paging record 1. Table 4 shows an example of paging records and paging causes using method 3.

TABLE 4

Paging Records and Paging Cause

| pagingRecordList | Paging record 1 | Paging record 2 | Paging record 3 | Paging record 4 | Paging record 5 |
|---|---|---|---|---|---|
| PagingCauseList-v17xy | Paging cause m | absent | absent | Present with cause n | |

Switching Notification

This section describes scenarios where a UE is connected to network A via a first USIM, and to another connection with Network B using another USIM. The UE may need to send a release request to network A. FIG. 5 details an example of a radio resource control based release procedure.

In the example of FIG. 5, after sending a release request message, the UE waits for an acknowledge message or expiration of a timer. If network A does not support multi-universal subscriber identity module (MUSIM) switching notification, the UE will not send a release request message. It would be advantageous to indicate to the UE whether the network supports the MUSIM switching notification feature or not. Whether the network supports the MUSIM switching notification feature or not can be included in the system information or NAS signaling. The network can indicate the length of the timer in the system information or dedicated NAS signaling.

Figure 7:
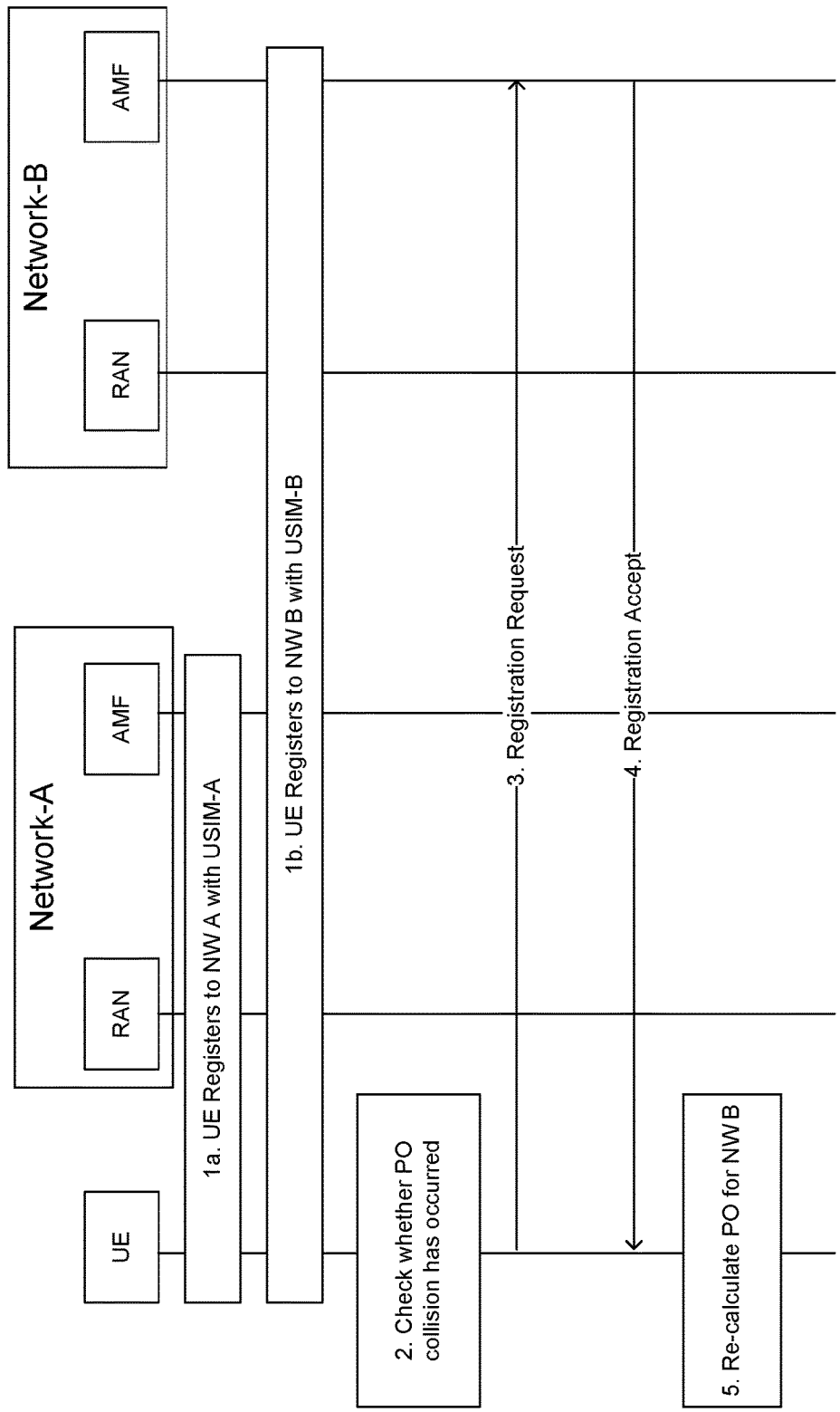
FIG. 7 depicts an example of a process for handling a paging collision.

FIG. 6 depicts an example of ASN.1 code for MUSIM switching notification. FIG. 7 depicts an example of a process for handling a paging collision.

Paging Collision

A MUSIM device that simultaneously monitors paging on all 3GPP RATs and systems in which it is in an idle state or an RRC inactive state (for 5GS) must determine the paging channel(s) to monitor which can lead to unsuccessful paging on other paging channels. In some cases, UE identifier values associated with the different USIMs can lead to systematic collisions which may result in corresponding missed pages. An example solution is detailed in FIG. 7.

If the MUSIM UE determines that a paging collision can occur, the MUSIM UE can select a registered network supporting a UE request for change of NAS parameters (e.g., network-B) and can perform a mobility registration update on that network. The registration request can include a new UE ID request indication and information to assist the access and mobility management function (AMF) for assignment of a new 5G NR global unique temporary identifier (5G-GUTI), e.g. a requested UE-ID value or range. The assistance information can be in the format of a UE_ID that provides the best timing of the paging.

In this solution, by reallocating a new 5G-STMSI, the Paging Occasion of the UE can be modified. The paging occasion is derived based on the 5G-STMSI. But it requires the UE to provide the assistance information to assist the AMF with assignment of the new 5G-GUTI, e.g. requested UE-ID value or range. But the UE does not have information about which UE-IDs have been used by the network e.g. assigned to the other UEs. If the requested UE-ID value or range has been assigned to the other UEs, the 5G-STMSI reallocation procedure may fail. To solve this problem, another solution is described below.

The network can assign more than one UE ID (e.g. 5G-STMSI) to the UE, and the UE can select one of the assigned UE IDs based on a neighbor cell paging control channel (PCCH) configuration to avoid the collision and send the selected UE ID to the network.

The network can indicate the multiple UE_IDs in a registration accept/attach accept message with a UE-ID (e.g 5G-STMSI or GUTI for 4G) list added.

The UE can indicate the selected UE ID to the network by a registration complete/attach complete message with the UE-ID (e.g 5G-STMSI or GUTI for 4G) or an index added to indicate the selected UE_ID.

Network Indication Multiple UE IDs when a Paging Collision Occurred

Figure 8:
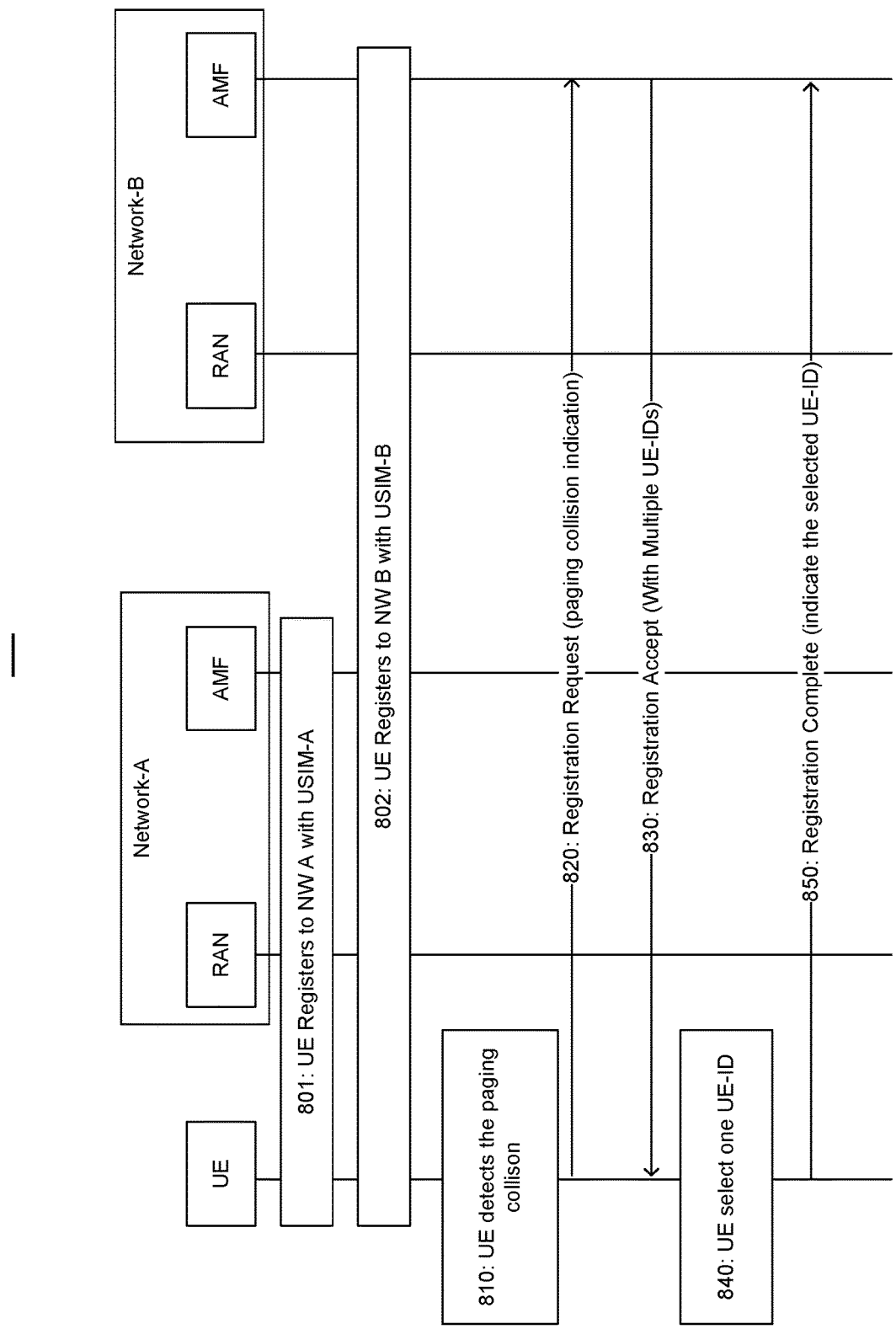
FIG. 8 depicts an example of a process for a network to indicate multiple UE IDs when a paging collision occurred.

FIG. 8 depicts an example of a process for a network to indicate multiple UE IDs when a paging collision occurred.

At 801, the UE registers to network A with USIM-A. At 802, the UE registers to network B with USIM-B. At 810, the UE detects a paging collision. At 820, a registration request (paging collision indication) is sent from the UE to the AMF. At 830, a registration accept message with Multiple UE-IDs is sent from the AMF to the UE. At 840, the UE selects one of the received UE-IDs. At 850, a registration complete message indicating the selected UE-ID is sent from the UE to the AMF.

Signaling via a Registration Accept Message

Table 5 show content for an example registration accept message.

TABLE 5

REGISTRATION ACCEPT message content

| IEI | Information Element | Type/Reference | Presence | Format | Length |
|---|---|---|---|---|---|
| | Extended protocol discriminator | Extended protocol discriminator 9.2 | M | V | 1 |
| | Security header type | Security header type 9.3 | M | V | 1/2 |
| | Spare half octet | Spare half octet 9.5 | M | V | 1/2 |
| | Registration accept message identity | Message type 9.7 | M | V | 1 |
| | 5GS registration result | 5GS registration result 9.11.3.6 | M | LV | 2 |
| 77 | 5G-GUTI | 5GS mobile identity 9.11.3.4 | O | TLV-E | 14 |
| ... | ... | ... | ... | ... | ... |
| 74 | Ciphering key data | Ciphering key data 9.11.3.18C | O | TLV-E | x-n |
| 77 | 5G-GUTI List | 5GS mobile identity List | O | TLV | |

| 8 | 7 | 6 | 5 | 4 | 3 | 2 | 1 | |
|---|---|---|---|---|---|---|---|---|
| 5GSmobile identity list IEI | | | | | | | | octet 1 |
| Length of 5GS mobile identity list contents | | | | | | | | octet 2 |
| 5GS mobile identity | | | | | | | | octet 3 |
| | | | | | | | | octet i |
| 5GS mobile identity | | | | | | | | octet i + 1* |
| | | | | | | | | octet 1* |
| ... | | | | | | | | octet 1 + 1* |
| | | | | | | | | octet m* |
| 5GS mobile identity | | | | | | | | octet m + 1* |
| | | | | | | | | octet n* |

Signaling via a Registration Complete Message

The selected UE_ID to the network or an index based on a LUE ID list can be added to the registration accept message. The UE_ID can be a dedicated UE_ID. Table 6 shows an example of message content for such a registration complete message.

TABLE 6

Registration Complete Message Content

| IEI | Information Element | Type/Reference | Presence | Format | Length |
|---|---|---|---|---|---|
| | Extended protocol discriminator | Extended protocol discriminator 9.2 | M | V | 1 |

TABLE 6-continued

Registration Complete Message Content

| IEI | Information Element | Type/Reference | Presence | Format | Length |
|---|---|---|---|---|---|
|  | Security header type | Security header type 9.3 | M | V | 1/2 |
|  | Spare half octet | Spare half octet 9.5 | M | V | 1/2 |
|  | Registration complete message identity | Message type 9.7 | M | V | 1 |
| 73 | SOR transparent container | SOR transparent container 9.11.3.51 | O | TLV-E | 20 |
| 77 | 5G-GUTI | 5GS mobile identity 9.11.3.4 | O | TLV-E | 14 |

| IEI | Information Element | Type/Reference | Presence | Format | Length |
|---|---|---|---|---|---|
|  | Extended protocol discriminator | Extended protocol discriminator 9.2 | M | V | 1 |
|  | Security header type | Security header type 9.3 | M | V | 1/2 |
|  | Spare half octet | Spare half octet 9.5 | M | V | 1/2 |
|  | Registration complete message identity | Message type 9.7 | M | V | 1 |
| 73 | SOR transparent container | SOR transparent container 9.11.3.51 | O | TLV-E | 20 |
|  | 5G-GUTI Index | Integer | O | V |  |

Summary of Selected Features

The following list summarizes some aspects of various embodiments.

A common cause value can be added to the paging message. No paging cause need be sent for paging records with the common paging cause. A paging cause need only be sent for paging records with a paging cause different from the common paging cause.

The size of PagingCauseList-v17x can be the number of the paging records with a particular paging cause. For example, if there are x paging records in the legacy pagingRecordList and y paging records have paging that cause, then the size of the agingRecordList-v17x is y.

The network can arrange the paging records first in the legacy pagingRecordList that have a particular paging cause.

The network can set the paging cause with the most paging records as the common paging cause.

At the UE, for each of the first y paging records if the corresponding paging cause in the PagingCauseList-v17x is set to absent, the common paging cause can be adopted, where the y is the size of PagingCauseList-v17x.

The network can indicate the number of paging records for each paging cause.

A pagingCauseStartValue parameter can indicate the first paging cause according to a paging cause sequence.

A PagingCauseList-v17xy parameter can indicate an index for each paging cause. The first element can correspond to the maximum paging record index for the pagingCauseStartValue. If there is only one paging cause, this list can be absent.

In a pagingRecordList the network can arrange paging records with paging cause "pagingCauseStartValue" first, then arrange the other paging records according to the paging case sequence later in the list.

The sequence the paging cause can be voice, spare1, spare2, spare3, spare4, spare5, spare6, spare7

The size of a PagingCauseList-v17x can be set to be the number of the paging records with a particular paging cause. For example, if there are x paging records in the legacy pagingRecordList, and y paging records have that paging cause, then the size of the agingRecordList-v17x is y.

The network can put the paging records that with paging cause together.

For a paging record with the same paging cause as the previous paging record, the pagingCause-r17 can be set to absent.

At the UE, for each of the first y paging records, if the corresponding paging cause in the PagingCauseList-v17x is set to absent, the paging cause of the previous paging record can be adopted, where the y is the size of PagingCauseList-v17x.

The network shall indicate to the UE whether or not the network supports a MUSIM switching notification/release request feature. The indication can be included in system information or in NAS signaling. The network can indicate the length of a timer in the system information or the NAS signaling.

The network can assign more than one UE ID (e.g. 5G-STMSI) to the UE and the UE can select one based on the neighbor cell PCCH configuration to avoid the collision and sent to the network.

A UE-ID (e.g 5G-STMSI or GUTI for 4G) list can be added to the registration accept/attach accept to indicate the multiple UE_IDs.

The UE can indicate the selected UE ID to the network via the registration complete/attach complete message by adding a UE-ID (e.g 5G-STMSI or GUTI for 4G) or an index to indicate the selected UE_ID.

Figure 9:
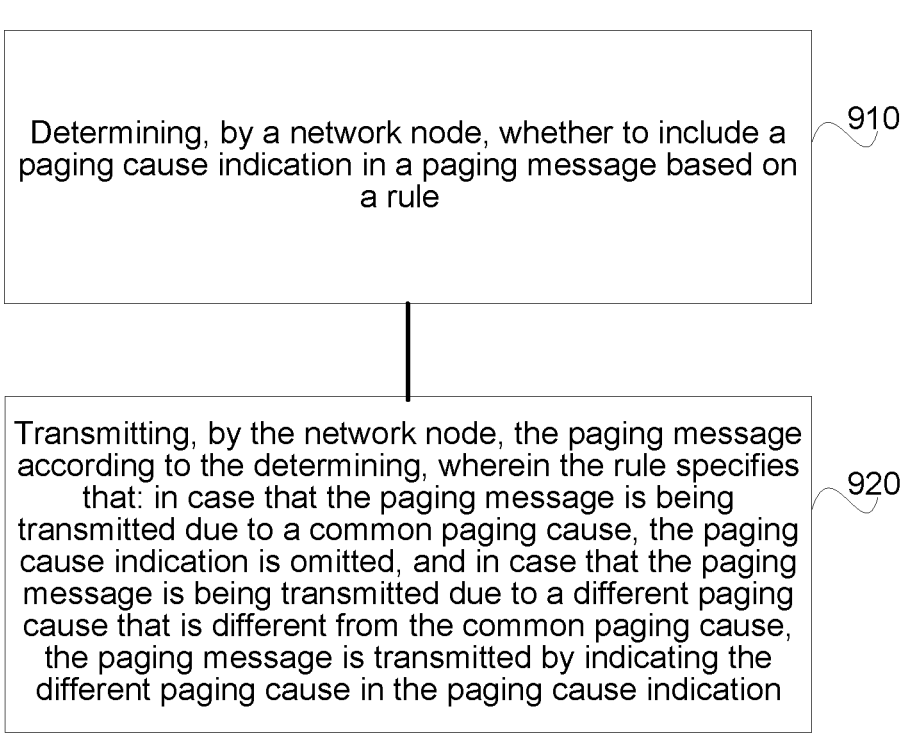

FIG. 9 shows an example of a method 900 for wireless communication. At 910, in some embodiments of the disclosed technology, the method includes determining, by a network node, whether to include a paging cause indication in a paging message based on a rule. At 920, the method further includes transmitting, by the network node, the paging message according to the determining, wherein the rule specifies that: in case that the paging message is being transmitted due to a common paging cause, the paging cause indication is omitted, and in case that the paging message is being transmitted due to a different paging cause that is different from the common paging cause, the paging message is transmitted by indicating the different paging cause in the paging cause indication.

Figure 10:
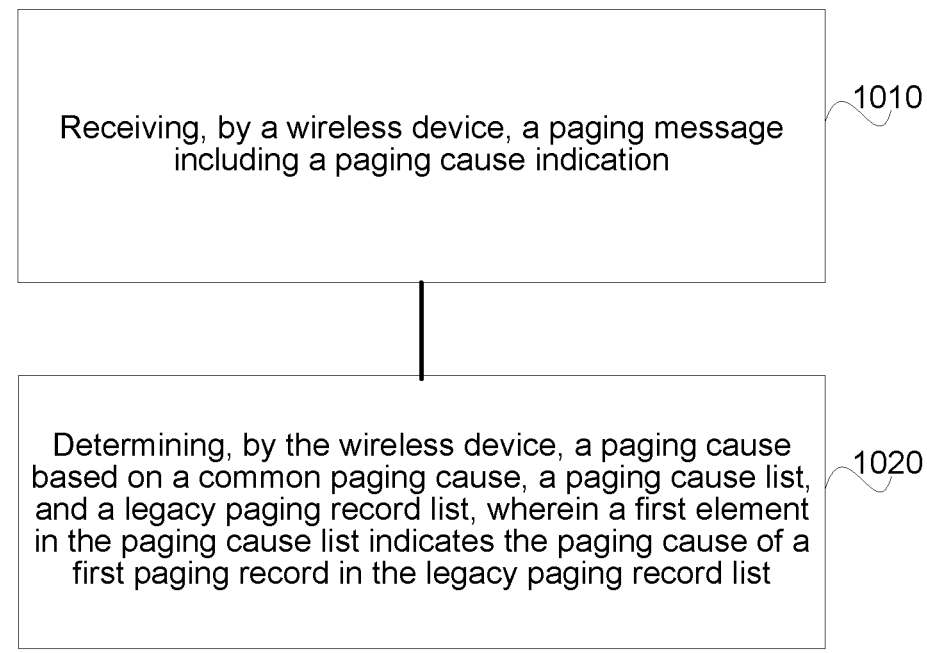

FIG. 10 shows another example of a method 1000 for wireless communication. At 1010, in some embodiments of the disclosed technology, the method includes receiving, by a wireless device, a paging message including a paging cause indication. At 1020, the method includes determining, by the wireless device, a paging cause based on a common paging cause, a paging cause list, and a legacy paging record list, wherein a first element in the paging cause list indicates the paging cause of a first paging record in the legacy paging record list.

FIG. 11 shows another example of a method 1100 for wireless communication. At 1110, in some embodiments of the disclosed technology, the method includes transmitting, from a network node to a wireless device, a paging message including one or more paging causes, wherein the paging message further includes a number of paging records for each of one or more paging causes.

Figure 12:
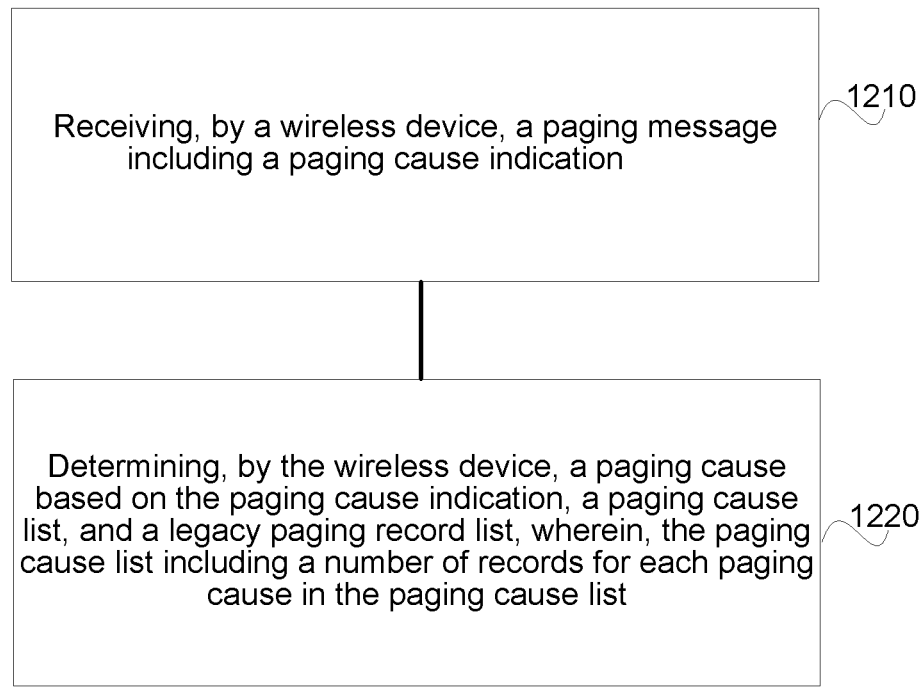

FIG. 12 shows another example of a method 1200 for wireless communication. At 1210, in some embodiments of the disclosed technology, the method includes receiving, by a wireless device, a paging message including a paging cause indication. At 1220, the method includes determining, by the wireless device, a paging cause based on the paging cause indication, a paging cause list, and a legacy paging record list, wherein the paging cause list including a number of records for each paging cause in the paging cause list.

Figure 13:
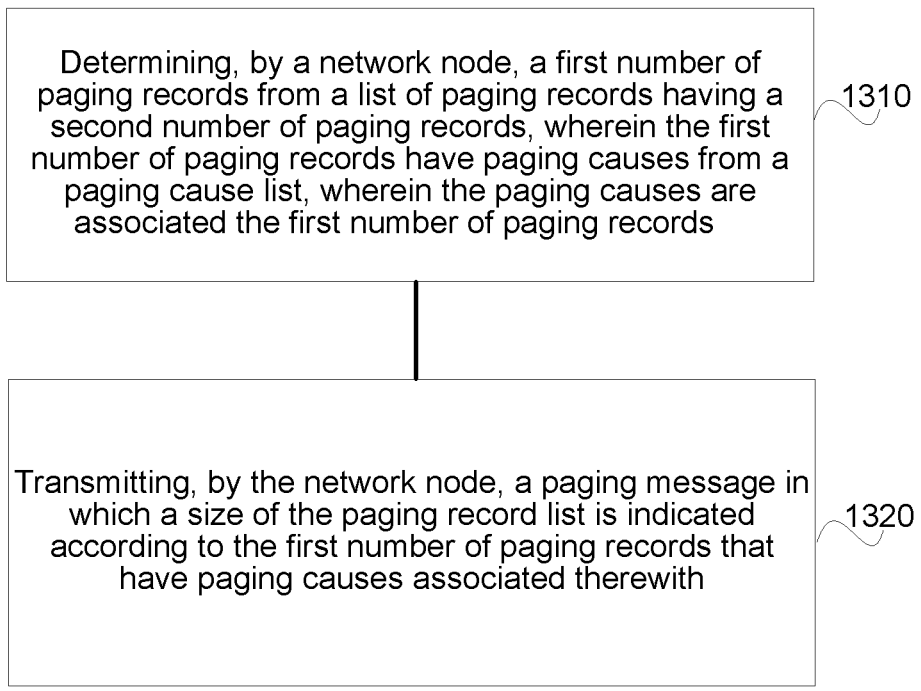

FIG. 13 shows another example of a method 1300 for wireless communication. At 1310, in some embodiments of the disclosed technology, the method includes determining, by a network node, a first number of paging records from a list of paging records having a second number of paging records, wherein the first number of paging records have paging causes from a paging cause list, wherein the paging causes are associated the first number of paging records. At 1320, the method includes transmitting, by the network node, a paging message in which a size of the paging record list is indicated according to the first number of paging records that have paging causes associated therewith.

Figure 14:
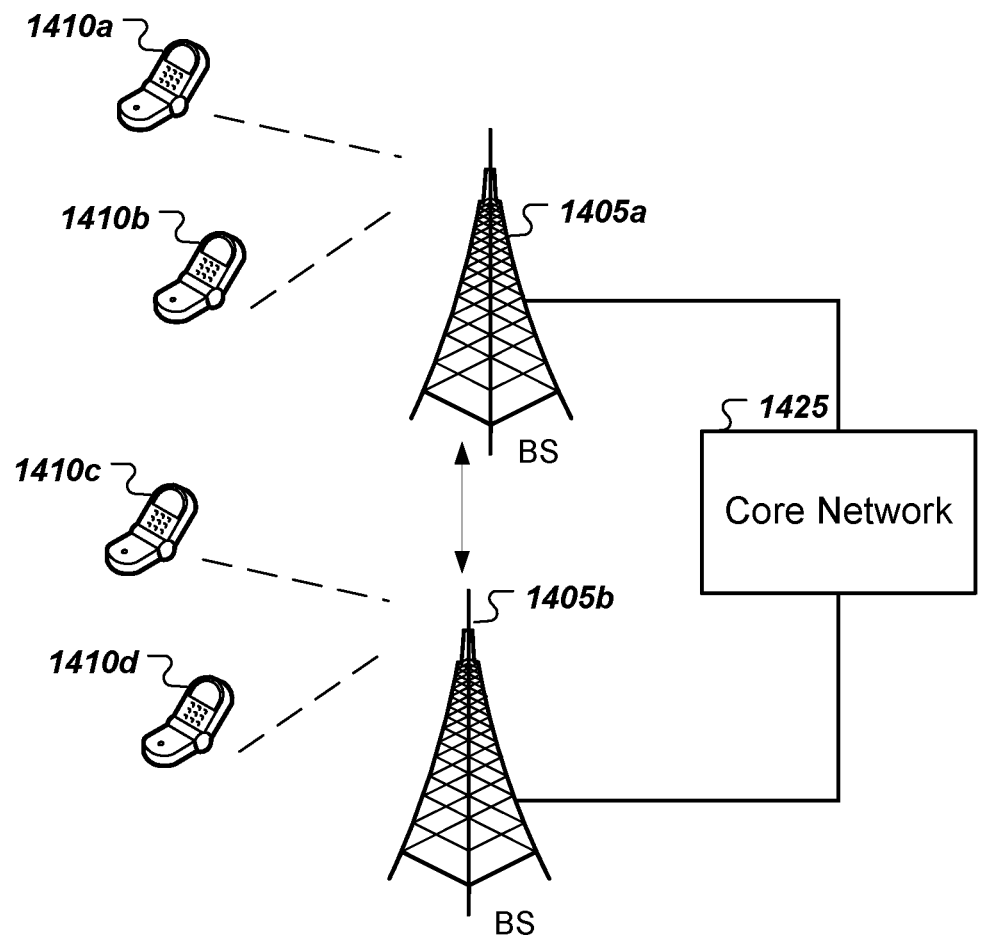
FIG. 14 depicts an example of a wireless communication system used to implement aspects of the disclosed subject matter.

FIG. 14 shows an example of a wireless communication system 1400 where techniques in accordance with one or more embodiments of the present technology can be applied. A wireless communication system 1400 can include one or more base stations (BSs) 1405a, 1405b, one or more wireless devices 1410a, 1410b, 1410c, 1410d, and a core network 1425. A base station 1405a, 1405b can provide wireless service to wireless devices 1410a, 1410b, 1410c and 1410d in one or more wireless sectors. In some implementations, a base station 1405a, 1405b includes directional antennas to produce two or more directional beams to provide wireless coverage in different sectors. The base station 1405a, 1405b may communicate directly with one another wirelessly or via a wired interface including a direct wired interface, a wired network, or the Internet.

The core network 1425 can communicate with one or more base stations 1405a, 1405b. The core network 1425 provides connectivity with other wireless communication systems and wired communication systems. The core network may include one or more service subscription databases to store information related to the subscribed wireless devices 1410a, 1410b, 1410c, and 1410d. A first base station 1405a can provide wireless service based on a first radio access technology, whereas a second base station 1405b can provide wireless service based on a second radio access technology. The base stations 1405a and 1405b may be co-located or may be separately installed in the field according to the deployment scenario. The wireless devices 1410a, 1410b, 1410c, and 1410d can support multiple different radio access technologies. The techniques and embodiments described in the present document may be implemented by the base stations described in the present document or by wireless devices.

Figure 15:
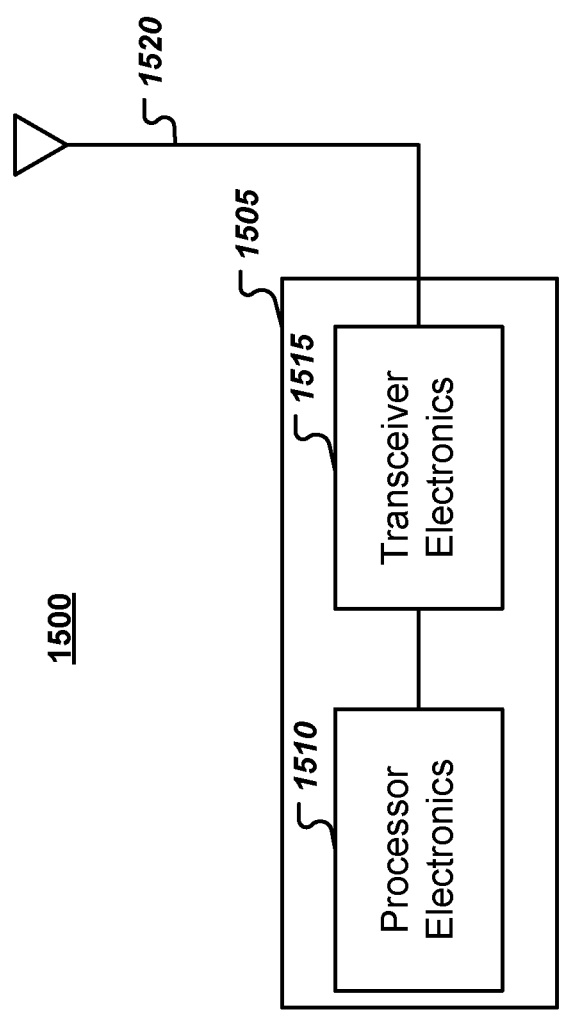
FIG. 15 depicts a block diagram representation of a portion of a radio station used to implement aspects of the disclosed subject matter.

FIG. 15 is a block diagram representation of a portion of a radio station in accordance with one or more embodiments of the present technology can be applied. A radio 1505 such as a base station or a wireless device (or UE) can include electronics 1510 such as a microprocessor that implements one or more of the wireless techniques presented in this document. The radio 1505 can include transceiver electronics 1515 to send and/or receive wireless signals over one or more communication interfaces such as antenna 1520. The radio 1505 can include other communication interfaces for transmitting and receiving data. Radio 1505 can include one or more memories (not explicitly shown) configured to store information such as data and/or instructions. In some implementations, the processor electronics 1510 can include at least a portion of the transceiver electronics 1515. In some embodiments, at least some of the disclosed techniques, modules or functions are implemented using the radio 1505. In some embodiments, the radio 1505 may be configured to perform the methods described in this document.

The technical solutions described by the following clauses may be preferably implemented by some embodiments.

Clause 1. A method of wireless communication, comprising: determining, by a network node, whether to include a paging cause indication in a paging message based on a rule; and transmitting, by the network node, the paging message according to the determining,
wherein the rule specifies that: in case that the paging message is being transmitted due to a common paging cause, the paging cause indication is omitted, and in case that the paging message is being transmitted due to a different paging cause that is different from the common paging cause, the paging message is transmitted by indicating the different paging cause in the paging cause indication.

Clause 2. The method of wireless communication of clause 1, further comprising:
transmitting, from the network node to the wireless device, a list of paging causes, wherein each paging record of a plurality of paging records has an associated at least one paging cause from the list of paging causes.

Clause 3. The method of wireless communication of clause 2, further comprising:
sorting paging records into a list according to each paging cause in the list of paging causes.

Clause 4. The method of wireless communication of clause 3, further comprising:
sorting paging records, without an associated paging cause, to the end of the list.

Clause 5. The method of wireless communication of clause 2, further comprising:
determining, from a paging cause with a largest quantity of associated paging records, the common paging cause.

Clause 6. The method of wireless communication of clause 1, further comprising:
assigning the common paging cause to paging records otherwise without a paging cause.

Clause 7. The method of wireless communication of clause 2, further comprising:
setting, for paging records with the common paging cause, a paging cause to an absent paging cause.

Clause 8. A method of wireless communication, comprising: receiving, by a wireless device, a paging message including a paging cause information; and determining, by the wireless device, a paging cause based on a common paging cause, a paging cause list, and a legacy paging record list, wherein a first element in the paging cause list indicates the paging cause of a first paging record in the legacy paging record list.

Clause 9. The method of wireless communication of clause 8, further comprising:
determining, by the wireless device, that the wireless device has the paging cause by checking whether the paging cause corresponds to the first y entries in the legacy paging record list, wherein y is a first size of the paging cause list which is less than or equal to a second size of a legacy paging record list.

Clause 10. The method of wireless communication of clause 9, further comprising:
determining, by the wireless device, a detailed paging cause according to a corresponding value in the paging cause list.

Clause 11. The method of wireless communication of clause 10, further comprising:
  adopting, by the wireless device, the last paging cause indicated in the paging cause list for an absent paging cause.

Clause 12. The method of wireless communication of clause 10, further comprising:
  adopting, by the wireless device, the common paging for an absent paging cause.

Clause 13. A method of wireless communication, comprising: transmitting, from a network node to a wireless device, a paging message including one or more paging causes, wherein the paging message further includes a number of paging records for each of one or more paging causes.

Clause 14. The method of wireless communication of clause 13, wherein each of the one or more quantities of paging records corresponds to a different paging cause of the one or more paging causes.

Clause 15. The method of wireless communication of clause 13, wherein the one or more paging causes are arranged in a sequence of paging causes with a first paging cause being the first paging cause in the sequence of paging causes.

Clause 16. The method of wireless communication of clause 13, wherein the paging causes are arranged with a voice paging cause being first.

Clause 17. The method of wireless communication of clause 15, further comprising:
  arranging paging records according to the sequence of paging causes with first paging records corresponding to the first paging cause are first in the arranged paging records.

Clause 18. The method of wireless communication of clause 13, further comprising: indicating, for each of the one or more paging causes, a starting paging record index corresponding to a starting paging record in the arranged paging records for a corresponding paging cause of the one or more paging causes.

Clause 19. A method of wireless communication, comprising: receiving, by a wireless device, a paging message including a paging cause indication; and determining, by the wireless device, a paging cause based on the paging cause indication, a paging cause list, and a legacy paging record list, wherein, the paging cause list including a number of records for each paging cause in the paging cause list.

Clause 20. The method of wireless communication of clause 19, further comprising:
  determining, by the wireless device, that the wireless device has the paging cause by checking whether the paging cause corresponds to the first y entries in the legacy paging record list, wherein y is a first size of the paging cause list which is less than or equal to a second size of a legacy paging record list.

Clause 21. The method of wireless communication of clause 19, further comprising:
  determining, by the wireless device, a detailed paging cause according to a corresponding value in the paging cause list.

Clause 22. The method of wireless communication of clause 19, further comprising:
  determining, by the wireless device, a detailed paging cause according to a number of records for each paging cause in the paging cause list.

Clause 23. A method of wireless communication, comprising: determining, by a network node, a first number of paging records from a list of paging records having a second number of paging records, wherein the first number of paging records have paging causes from a paging cause list, wherein the paging causes are associated the first number of paging records; and transmitting, by the network node, a paging message in which a size of the paging record list is indicated according to the first number of paging records that have paging causes associated therewith.

Clause 24. The method of wireless communication of clause 23, further comprising:
  arranging paging records associated with each of the paging causes according to paging cause.

Clause 25. The method of wireless communication of clause 23, further comprising:
  transmitting a paging cause, from the paging causes, for a first paging record in the arranged paging records, and not transmitting the paging cause for subsequent paging records with a same paging cause.

Clause 26. The method of wireless communication of clause 23, wherein, a previous paging cause corresponding to an immediately preceding paging record is used for a paging record from the arranged paging records that does not have an associated paging cause.

Clause 27. The method of wireless communication of clause 23, wherein the second number is greater than or equal to the first number.

Clause 28. A method of wireless communication, comprising: receiving, by a wireless device, a paging message including a paging cause indication; and determining, by the wireless device, the paging cause based on the paging cause indication, a paging cause list, and a legacy paging record list, wherein a first element in the paging cause list indicates a first paging cause of a first paging record in the legacy paging record list.

Clause 29. The method of wireless communication of clause 28, further comprising:
  determining, by the wireless device, a detailed paging cause according to a corresponding value in the paging cause list.

Clause 30. The method of wireless communication of clause 28, further comprising:
  determining, by the wireless device, a detailed paging cause according to a number of records for each paging cause in the paging cause list.

Clause 31. A method of wireless communication, comprising: transmitting, by a network node to a wireless device, an indication that the network node is capable of performing multi-SIM switching and release, wherein the indication is carried in a system information message or a non-access stratum message.

Clause 32. The method of wireless communication of clause 31 further comprising:
  transmitting, by a network node to a wireless device, an indication of a timer length.

Clause 33. A method of wireless communication, comprising: receiving, at a wireless device, a plurality of wireless device identifiers for the wireless device; and selecting, by the wireless device, one of the plurality of wireless device identifiers based on a paging control channel (PCCH) configuration in a neighboring cell that avoids a paging collision.

Clause 34. The method of wireless communication of clause 33, further comprising:
  transmitting, by the wireless device, the selected wireless device identifier to the network.

Clause 35. The method of wireless communication of clause 33, wherein the plurality of wireless device identifiers is received via a registration accept message.

Clause 36. The method of wireless communication of clause 33, wherein the selected wireless device identifier is indicated by an index sent via a registration accept complete message to a network.

In the technical solutions described herein in clause format, the network node may be a network device or a network-side equipment such as a base station. The wireless device may be any type of wireless device as described above.

FIG. 14 shows an example hardware platform for implementing the network node or a wireless device.

It will be appreciated that the present document discloses techniques that can be embodied in various embodiments to establish multi-SIM functions in a cellular network. The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

Some embodiments may preferably implement one or more of the following solutions, listed in clause-format. The following clauses are supported and further described in the Examples above and throughout this document. As used in the clauses below and in the claims, a wireless terminal may be user equipment, mobile station, or any other wireless terminal including fixed nodes such as base stations. A network node includes a base station including a next generation Node B (gNB), enhanced Node B (eNB), or any other device that performs as a base station. A resource range may refer to a range of time-frequency resources or blocks.

What is claimed is:

1. A method of wireless communication, comprising:
   transmitting, by a first base station to a multi-universal subscriber identity module (MUSIM) wireless device, an indication that the first base station is capable of performing MUSIM switching and release,
   wherein the indication further indicates multiple identifiers for the MUSIM wireless device;
   receiving, by the first base station, a response from the MUSIM wireless device, wherein the response indicates a selection of one of the multiple identifiers as an identifier for the MUSIM wireless device;
   determining, by the first base station, a paging message comprising a plurality of paging records, each paging record associated with a corresponding paging cause generated by the first base station;
   determining, by the first base station, a common paging cause that corresponds to a paging cause associated with a largest number of paging records;
   transmitting, by the first base station to the MUSIM wireless device that is connected with a second base station, the paging message by including (a) the common paging cause and (b) a trigger reason for the paging message that enables the MUSIM wireless device to determine whether to operate in a dual connected state with the first base station and the second base station.

2. The method of wireless communication of claim 1, further comprising:
   sorting the plurality of paging records into a list according to each paging cause in the list of paging causes.

3. The method of wireless communication of claim 2, further comprising:

sorting paging records without associated at least one paging cause to an end of the list.

4. The method of wireless communication of claim 1, further comprising:
assigning the common paging cause to paging records otherwise without a paging cause.

5. A method of wireless communication, comprising:
receiving, by a multi-universal subscriber identity module (MUSIM) wireless device that is connected to a second base station, an indication from a first base station that the first base station is capable of performing MUSIM switching and release, wherein the indication indicates multiple identifiers for the MUSIM wireless device;
transmitting, by the MUSIM wireless device to the first base station, a response that indicates a selection of one of the multiple identifiers as an identifier for the MUSIM wireless device;
receiving, from the first base station, a paging message comprising a plurality of paging records, each paging record being associated with a corresponding paging cause, the paging message further including a common paging cause that corresponds to a paging cause associated with a largest number of paging records and a trigger reason for the paging message; and
determining, by the MUSIM wireless device, based on the common paging cause and paging causes associated with the plurality of paging records in the paging message, to operate in a dual connected state or be connected to a single network.

6. The method of wireless communication of claim 5, further comprising:
determining, by the MUSIM wireless device, that the MUSIM wireless device has a specific paging cause received in the paging message by checking whether the specific paging cause corresponds to first y entries in a legacy paging record list, wherein y is a first size of a paging cause list which is less than or equal to a second size of the legacy paging record list.

7. The method of wireless communication of claim 6, further comprising:
determining, by the MUSIM wireless device, a detailed paging cause according to a corresponding value in the paging cause list.

8. The method of wireless communication of claim 7, further comprising:
adopting, by the MUSIM wireless device, a last paging cause indicated in the paging cause list for an absent paging cause.

9. The method of wireless communication of claim 7, further comprising:
adopting, by the MUSIM wireless device, the common paging for an absent paging cause.

10. A wireless device comprising processor electronics configured to cause the wireless device to implement a method comprising:
receiving, by a multi-universal subscriber identity module (MUSIM) wireless device that is connected to a second base station, an indication from a first base station that the first base station is capable of performing MUSIM switching and release, wherein the indication indicates multiple identifiers for the MUSIM wireless device;
transmitting, by the MUSIM wireless device to the first base station, a response that indicates a selection of one of the multiple identifiers as an identifier for the MUSIM wireless device;
receiving, from the first base station, a paging message comprising a number of paging records, each paging record being associated with a corresponding paging cause, the paging message further including a common paging cause that corresponds to a paging cause associated with a largest number of paging records and a trigger reason for the paging message; and
determining, by the MUSIM wireless device, based on the common paging cause and paging causes associated with the plurality of paging records in the paging message, to operate in a dual connected state or be connected to a single network.

11. The wireless device of claim 10, wherein the method further includes:
determining, by the MUSIM wireless device, that the MUSIM wireless device has a specific paging cause received in the paging message by checking whether the specific paging cause corresponds to first y entries in a legacy paging record list, wherein y is a first size of a paging cause list which is less than or equal to a second size of the legacy paging record list.

12. The wireless device of claim 11, wherein the method further includes:
determining, by the MUSIM wireless device, a detailed paging cause according to a corresponding value in the paging cause list.

13. The wireless device of claim 12, wherein the method further includes:
adopting, by the MUSIM wireless device, a last paging cause indicated in the paging cause list for an absent paging cause.

14. The wireless device of claim 10, wherein the method further includes:
adopting, by the MUSIM wireless device, the common paging for an absent paging cause.

* * * * *